United States Patent Office 3,716,768
Patented Feb. 13, 1973

3,716,768
CONTROL ARRANGEMENT FOR ELECTRICALLY PROPELLED TRACTION VEHICLE
William B. Mason, Schenectady, N.Y., assignor to General Electric Company
Filed Mar. 20, 1972, Ser. No. 236,105
Int. Cl. H02p 7/14
U.S. Cl. 318—139
13 Claims

ABSTRACT OF THE DISCLOSURE

A control arrangement for a battery powered traction vehicle having a foot pedal type of throttle control. Application of increasing pressure to the pedal sequentially closes a motor contractor to energize the motor, closes armature switches to decrease series armature resistance, and opens field weakening switches to provide field weakening. Provision is made for motor operation at predetermined torque-speed increment without continued application of pedal pressure. A logic circuit is responsive to closure of a preselected armature switch and of a preselected field weakening switch is connected in circuit with a relay connected to maintain operation of the vehicle at the desired torque-speed increment upon activation of a control switch.

BACKGROUND OF THE INVENTION

This invention relates to propulsion control systems for electrically propelled traction vehicles, and in particular to systems for controlling direct current motor means.

Traction vehicles are generally provided with an operator actuated adjustable control, hereinafter referred to as a throttle control, for modifying the torque vs. speed characteristic. In electric motor propulsion ssytems, movement of the control commonly modifies motor armature current and field flux to modify the torque vs. speed characteristic. Frequently advance of the throttle control member decreases armature resistance and for a given load results in increased acceleration. Additional advancement at the throttle control member may introduce field weakening so as to decrease field flux and provide increased motor speed.

In arrangements of this type movement of the throttle member through its range commonly varies the electrical efficiency of the electrical propulsion system. For example, in low settings of the throttle member, armature resistors inserted in the motor armature circuit will dissipate excess power. In high settings excess power may be dissipated as a result of field weakening. Thus where both armature current control and field weakening are utilized maximum electrical efficency may be obtained at some interium setting of the control member. It is desirable to operate battery powered traction vehicles at this interim throttle setting in order to conserve their limited stored energy.

Additionally, certain types of vehicle operation are best performed at a predetermined intermediate torque-speed increment. For example, a tractor incorporating a rotary lawn mower should be operated at a reasonably fast speed to minimize mowing time. However, if the speed is excessive, the number of rotations of the mower blades while passing over a unit area of grass may be insufficient to assure adequate cutting. Accordingly, during mowing it is desirable to operate the vehicle at an intermediate speed which provides optimum cutting action. The gear ratio between the motor shaft and the driven axle of the vehicle can be selected so that the optimum speed is attained when the throttle member is set to the intermediate throttle position which provides near optimum electrical efficiency. In the event the vehicle is to perform plural operating functions, such as mowing and snow plowing, the gear ratio may be modified for each type of operation so that satisfactory speed and electrical efficiency are attained at the same intermediate setting of the throttle member. For example, the gear ratio of transaxle type systems, coupled intermediate the vehicle propulsion motor and the traction wheels, may be altered by means of a gear shift lever which is preset prior to actuation of the vehicle.

Some electrically propelled traction vehicles utilize a setable throttle member, such as a handle, which can be directly set to, and left at, any selected throttle position. During operation handles of this type can be directly and visually set to the position or notch which provides the desired electrical efficiency and vehicle speed. A propulsion system utilizing such a throttle handle arrangement is disclosed in applicant's co-pending application, Ser. No. 10,863, filed Feb. 12, 1970, entitled "Control Circuits for an Electric Tractor." Arrangements of this type, however, usually require special control circuitry to prevent excessive changes in acceleration, and in other motor parameters, which could otherwise result from excessive movement of the throttle member.

Mechanically biased throttle members, including particularly spring biased foot pedals, are commonly utilized to control operation of traction vehicles. Such throttle members are normally biased to an "OFF," or minimum torque-speed increment, position. Accordingly, the selected torque-speed increment, and throttle member position, is a function of applied operator pressure. This permits the operator to effectively sense and control the operation of the propulsion systems, such as by instantaneously releasing pressure from the pedal when there is excessive acceleration. Therefore systems utilizing biased throttle members can dispense with some of the control arrangements which are otherwise required, with direct setting throttle members, to prevent excessive rates of change in acceleration and other motor parameters.

However, biased throttle members have known disadvantages. The operator must exert continuous pressure on the control during vehicle operation and must control this pressure to maintain operation at the desired torque-speed increment. This is particularly difficult in propulsion systems wherein displacement of the biased throttle member sequentially actuates a large number of discrete throttle positions.

It is therefore desirable to provide a vehicular propulsion control system, having a biased throttle member, and an override arrangement, which permits operation at one or more predetermined torque-speed increments without requiring the operator to maintain pressure on the throttle member. Systems for performing a similar function have been utilized in conventional automobiles, such arrangements have, however, been based on maintaining vehicle operation at a constant speed by the use of complex speed sensing and feedback arrangements and are unsuitable partially because of their high cost and complexity for application to inexpensive electrically powered traction vehicles.

Accordingly, it is an object of this invention to provide an improved control system of the type utilizing a biased throttle member for controlling the output of the electrical propulsion motors of traction vehicles.

It is a further object to provide such a control system with a simple and inexpensive override arrangement which permits the operator to maintain operation in a predetermined torque-speed increment without the continued application of pressure on the biased throttle member.

It is yet a further object of the invention to provide means for automatically disengaging operation of the override arrangement under predetermined conditions.

It is another object to provide indicating means to

SUMMARY OF THE INVENTION

Briefly stated in accordance to one aspect of the invention, the magnitude of impedance means coupled in circuit with the windings of D-C traction motor means is modified by actuation of control switches each having a first quiescent state and a second actuated state, a mechanically biased throttle member is coupled to the control switches such that application of increasing pressure on the throttle member sequentially actuates the control switches in a predetermined sequence so as to increase the output speed of the motor means. A logic circuit is connected so as to be responsive to the state of a predetermined first one of said control switches and to the state of such second control switch as is normally actuated successively to the first one. Override switching means and relay means are coupled in circuit with the logic circuit such that the relay means can be initially energized, by actuation of the override switch solely when said first control switch is actuated and the second control switch is in its quiescent state. Preferably said first control switch modifies the magnitude of an impedance coupled in circuit with an armature winding and the second control switch modifies an impedance coupled in circuit with a field winding of the motor means. Means responsive to energization of the relay means maintain the impedance magnitude of said impedance means and provides continued motor operation upon removal of pressure from said throttle member until the relay means are de-energized. The source may be coupled to the motor means via motor motion contacting means which are closed upon application of pressure to the throttle member. Additional means provide for continued closure of the contacting means during energization of the relay means.

The novel features believed characteristic of the invention are pointed out with particularity in the appended claims. The invention itself, however, both as to its organization and method of operation, as well as further objects and advantages, may best be understood by reference to the following description taken in conjunction with the accompanying drawings.

DESCRIPTION OF THE PREFERRED EMBODIMENT

Figure 1:
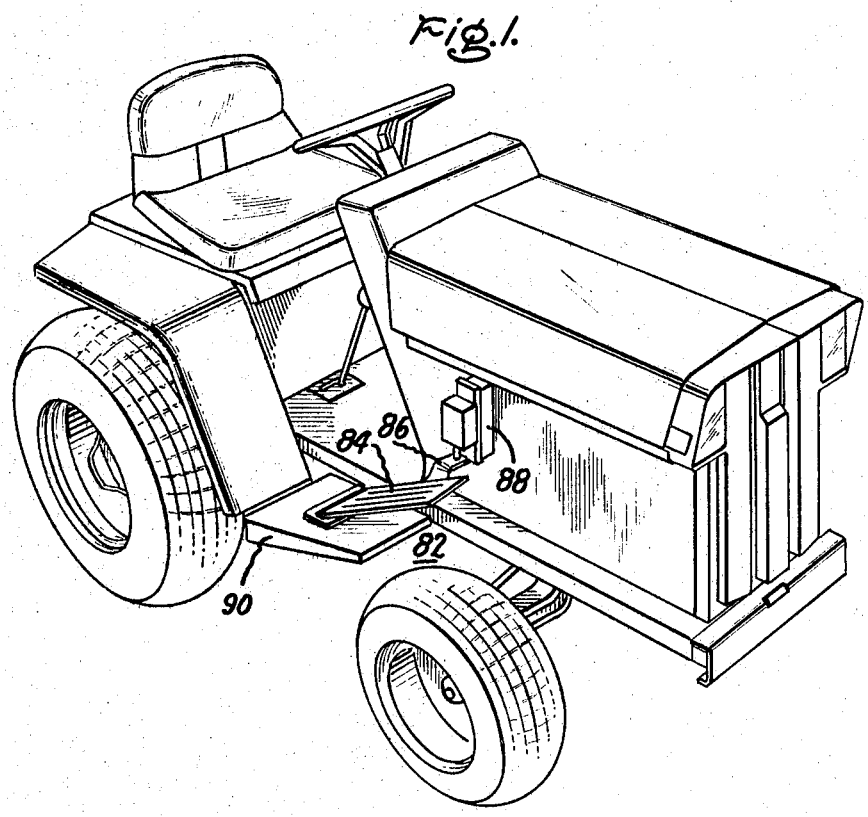
FIG. 1 represents an electrically propelled traction vehicle equipped with a mechanically biased throttle member.

Referring now to FIG. 1 there is illustrated an electric tractor having a similar configuration and operating controls to that disclosed in the referenced application, Ser. No. 10,863. A throttle assembly 82 is provided for starting, stopping and controlling the speed of the electric motor propelling the tractor. This comprises a foot pedal 84, having its rear surface pivotably mounted on a running board 90, a linkage 86, and a control box 88. The linkage 86 connects the foot pedal to the control box such that the pedal is normally mechanically biased in an upward position. The control box contains a plurality of control switches which are actuated in sequence as the foot pedal is depressed and which are released in opposite sequence as the foot pedal is depressed and which are released in opposite sequence as the foot pedal is returned to its normal state. In the preferred embodiment depression of the foot pedal initially provides electric power to the motor, then sequentially shunts three increments of motor armature resistance and, when the vehicle operates in the forward direction, additionally adds four resistance increments in the motor shunt field circuit to provide additional steps of field weakening. A foot throttle assembly suitable for this type of operation is disclosed in the co-pending patent application of Douglas R. Houst entitled "Cam Actuated Switching Mechanism," and assigned to the assignee of this application. The subject invention is of course not restricted to the use of this type of foot throttle assembly.

Figure 2:
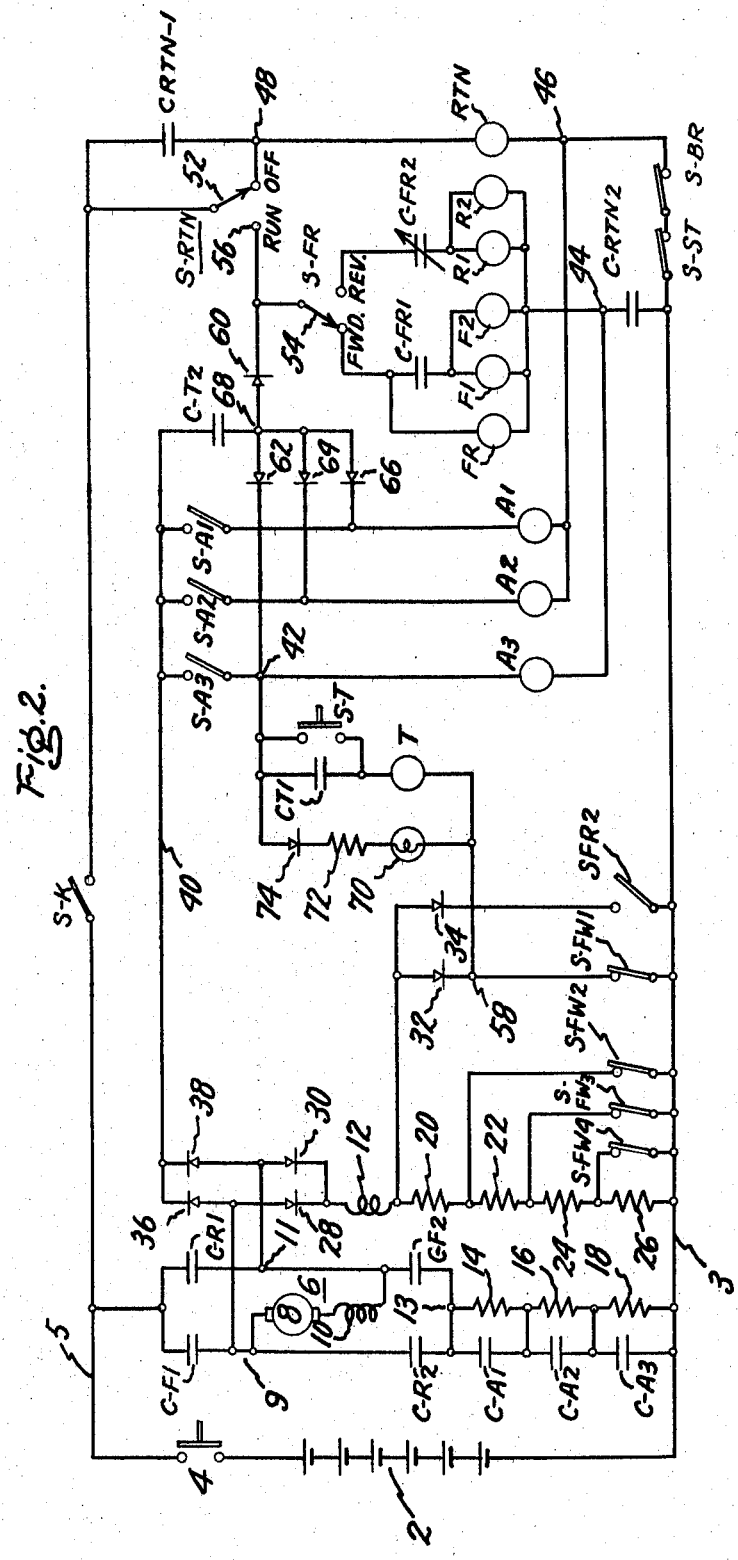
FIG. 2 is a schematic diagram of the system of the present invention.

Reference is now made to FIG. 2 for a description of the propulsion motor and control system. A source of unidirectional operating voltage 2, comprising a group of storage batteries, energizes electric propulsion motor 6. Operation of the motor is principally controlled by actuation of the switches located in control box 88 of the throttle assembly 82.

The preferred embodiment incorporates a compound type of D-C motor 6 having an armature 8, serially connected to a compensating series winding 10, and a separate shunt winding 12. Electric power is applied from battery 2 to negative line 3 and through disconnect switch 4 to positive line 5. The motor windings are connected through motion contactors to line 5 and through armature and field resistance means to line 3 as subsequently described.

The armature 8 and series winding 10 are serially connected between junctions 9 and 11 of a bridge circuit comprising forward motion contactors C-F1 and C-F2 and reverse motion contactors CR-1 and CR-2. Contactors C-F1 and C-R1 each have one terminal connected to line 5 and their other terminals connected, respectively, to junctions 9 and 11. Similarly contactors C-R2 and C-F2 each have one terminal connected to junction 13 and their other terminals connected, respectively to terminals 9 and 11. Armature resistors 14, 16, and 18 are serially connected between junction 13 and negative line 3. Armature resistor contactors CA-1, CA-2, and CA-3 are, respectively, connected in parallel with resistors 14, 16, and 18. As described subsequently, these contactors are normally open but are sequentially closed during advancement of the throttle to decrease armature resistance. As will be described subsequently, for forward propulsion of the vehicle, contactors C-F1 and C-F2 are closed, by operation of a forward-reverse switch, so that armature 8 and series winding 10 are serially connected from the positive line 5 through the armature resistor circuit to negative line 3. For reverse propulsion, contactors C-R1 and C-R2 are closed, by operation of the forward-reverse switch, to provide for similar connection, but with the serially connected armature and series winding being oppositely poled in respect to their connection for forward propulsion.

One terminal of shunt winding 12 is connected through diode 28 to junction 9 and through diode 30 to junction 11. During forward propulsion the field winding is thus connected to positive line 5 through forward contactor C-F1 and diode 28, and during reverse propulsion it is connected to the positive line through reverse contactor C-R1 and diode 30. The other terminal of winding 12 is connected in series circuit with field weakening resistors 20, 22, 24, and 26 to negative line 3. Diode 32 and field weakening switch S-FW1 are connected in series circuit from the junction of winding 12 and resistor 20 to negative line 3. Additional field weakening switches S-FW2, S-FW3, and S-FW4 are connected from ground line 3 to, respectively, the junction of resistors 20 and 22, the junction of resistors 22 and 24, and the junction of resistors 24 and 26. The field weakening switches S-FW1, S-FW2, S-FW3, and S-FW4 (incorporated in the control box 88 of the throttle assembly) are normally closed, but are sequentially opened when the trottle is depressed so that field weakening resistors 20, 22, 24 and 26 are sequentially added in series with the field winding. Diode 32, is poled to permit current to flow through the field winding. Diode 34, is serially connected with switch S-FR2 from the junction of field winding 12 and resistor 20 to ground line 3. Switch S-FR2 is closed during propulsion in the reverse direction so as to shunt the field weakening resistors and preclude excessive reverse speeds.

As previously stated, the operation of the motor is principally controlled by switches located in control box 88. However, the electrical propulsion system of the preferred embodiment includes the following additional switches, which may be mounted on the dashboard of the vehicle: the main disconnect switch 4 (previously described), a key switch S-K for actuating the vehicle electrical system, a forward-reverse switch S-FR for changing the direction of vehicle travel, and an override control switch S-T whose function will be described subsequently.

The preferred embodiment also incorporates safety circuitry to assure that electrical power is removed from the motor 6 upon the occurrence of predetermined events, and that the power is not reapplied until pressure is released from the foot pedal so that the throttle is in a stop or neutral position. A brake switch S-BR, associated with the pedal of a mechanical brake, opens when the brake is actuated. A seat switch S-ST, located adjacent to the seat of the tractor, opens when an operator gets off the tractor seat so as to interrupt the applicaion of propulsion power. In the event either of these switches, the disconnect switch 4, or the key switch S-K is opened, power is removed from the electric motor. A return to neutral circuit which includes starting switch S-RTN, of the throttle assembly, prevents the reapplication of electrical power to the motor until the aforesaid switches are returned to the on-state and the throttle is returned to the OFF, or neutral position.

The throttle assembly, used in the preferred embodiment, incorporates 8 switches which are sequentially actuated in the order recited below as the foot pedal is depressed:

| Description of switch | Kind | Designation |
| --- | --- | --- |
| 1. Starting switch | Single pole-double throw | S-RTN |
| 2. Armature switch 1 | Normally open | S-A1 |
| 3. Armature switch 2 | do | S-A2 |
| 4. Armature switch 3 | do | S-A3 |
| 5. Field weakening switch 1 | Normally closed | S-FW1 |
| 6. Field weakening switch 2 | do | S-FW2 |
| 7. Field weakening switch 3 | do | S-FW3 |
| 8. Field weakening switch 4 | do | S-FW4 |

Accordingly, the foot throttle assembly has nine different states of operation. In the first, neutral, position the start relay S-RTN is in the Off state with switch arm 52 contacting the OFF terminal. In the second position the start relay is switched to the ON state, which it retains for all subsequent positions of the throttle with switch arm 52 contacting the ON terminal. In the third through fifth positions armature switches A-A1, S-A2, and S-A3 are sequentially actuated so as to sequentially close armature contactors C-A1, C-A2, and C-A3 and shunt armature resistors 14, 16, and 18. In the sixth through ninth positions, field weakening resistors S-FW1, S-FW2, and S-FW3 and S-FW4 are sequentially opened so as to effectively add resistors 20, 22, 24, and 26 in series with the shunt field circuit for field weakening.

The starting switch S-RTN has its arm 52 connected through disconnect switch S-K to positive line 5. The OFF contact 48 of the starting switch is connected to negative line 3 through serially connected start solenoid RTN, brake switch S-BRR and seat switch S-ST. When the foot throttle is in the neutral position, with start switch arm 52 contacting the OFF contact, and switches S-K, S-ST and S-BR in their normally closed position, the start solenoid RTN is energized and normally open contactors C-RTN1 and C-RTN2 are closed. Power is applied to the traction motor only when contactor C-RTN2 is closed. Contactor C-RTN1 connected between switch arm 52 and contact 48 is a holding contactor for solenoid RTN. When the foot pedal is depressed, and switch arm 52 is set to RUN terminal 56, solenoid RTN remains actuated until any of switches 4, S-K, S-BR or S-ST are opened. If any of these are opened when the Start switch is in the RUN position, i.e. the foot throttle is depressed, the solenoid RTN will be de-energized until the foot pedal is returned to the neutral, OFF, position so that the start-switch is switched to the OFF position. This arrangement, therefore, provides the previously described "return to neutral" feature.

When the throttle is depressed start switch arm 52 is connected to the RUN terminal 56, which in turn is connected to arm 54 of forward-reverse switch S-FR. This switch when in the forward (FWD) position, actuates solenoids F1 and F2 which in turn, respectively, close contactors C-F1 and C-F2 to provide for actuation of the motor in the forward direction. When switch S-FR is in the reverse (REV) position, solenoids R1 and R2 are actuated which in turn, respectively, close contactors C-R1 and C-R2 to provide for actuation of the motor in the reverse direction.

The forward, FWD, contact of the start switch is serially connected through contactor FR1 to one terminal of solenoids F1 and F2 and is directly connected to one terminal of solenoid FR. The other terminals of solenoids FR, F1 and F2 are connected in series with contactor C-RTN2 to negative line 3. Thus when the throttle is depressed beyond the neutral position and switch S-FR is in the forward position solenoid FR is energized, closing contactor C-FR1 so as to energize solenoids F1 and F2. This closes contactors C-F1 and C-F2 so as to actuate motor 6 in the forward direction. The reverse, REV, contact of the start switch is serially connected through contactor C-FR2 to one terminal of solenoids R1 and R2 whose other terminals are connected in series circuit through contactor C-RTN2 to negative line 3. When arm 54 of the forward and reverse switch is moved to the reverse position, current flow is terminated through solenoid FR, so as to open contactor S-FR1, and close contactor C-FR2. Accordingly, contactors C-F1 and C-F2 are opened and, when the throttle is depressed beyond the neutral position, solenoids R1 and R2 are energized. This closes contactors C-R1 and C-R2 and provides for actuation of motor 6 in the reverse direction.

In order to avoid excessive speeds in the reverse direction, the field weakening resistors 20, 22, 24 and 26 are shunted by switch S-FR2 when switch S-FR2 is in the reverse position. Switch S-FR2, ganged to switch S-FR, is connected in series with diode 34 across the field weakening resistors. Switch S-FR2 is open when switch S-FR is in the forward position, but is closed when switch S-FR is in the reverse position.

When the throttle is depressed beyond the neutral position, armature resistors 14, 16 and 18 are sequentially shunted, respectively, by contactors C-A1, C-A2, and C-A3. This is accomplished by the circuit comprising line 40, armature switches S-A1, S-A2 and S-A3 and solenoids A1, A2 and A3. Junction 9 is connected through diode 36 to line 40 and junction 11 is connected through diole 39 to line 40. The diodes are poled so that positive potential appears on line 40 when either the forward contactor C-F1 or the reverse contactor C-R1 is closed. Switches S-A1, and S-A3 have one terminal connected to line 40 and their other terminal connected to a terminal of their associated solenoid, i.e., S-A1 is connected to solenoid A1 etc. The other terminals of solenoids A1 and A2 are connected to the junction 46 between solenoid RTN and brake switch S-BR. The other terminal of solenoid A3 is connected to junction 44 between the terminals of solenoids FR, F1, F2, R1, R2 and contactor C-RTN2. Closure of any armature switch thus actuates its associated armature solenoid and results in closure of the associated armature contactor. This relay arrangement is utilized, in lieu of direct switching of the armature resistors, primarily in view of the high transient currents encountered during armature switching. Depression of the throttle from the second through the fifth position results in sequential actuation of armature solenoids A1, A2, and A3, and in sequential reduction of armature resistance. Further depression of the throttle from the fifth through the ninth position results in sequential opening of field weakening switches S-FW1, S-FW2, S-FW3 and S-FW4, and during forward propulsion, in increasing steps of field weakening.

In the propulsion system described above, depression of a foot pedal modifies the magnitude of first impedance means to control motor armature current and of second impedance means to control the flux of the motor field so as to provide a wide torque vs. speed range. This range extends from minimal speeds attainable with maximum armature resistance to maximum speeds attainable without armature resistance and with maximum field weakening. For normal operation it is desirable to operate the vehicle at an intermediate torque-speed characteristic both in order to attain maximum electrical efficiency and to attain an optimum driving speed. In the preferred embodiment described, herein, this is obtained in position 5 of the throttle when the armature resistors and the field weakening resistors are shunted. For the particular drive motor, this provides greatest electrical efficiency since no excess power loss results from the armature resistor or from the armature resistors or from field weakening, and additionally provides an optimum torque-speed range for normal operation of the tractor. In accordance to the invention an override arrangement is provided for selectively maintaining the propulsion motor system in the torque-speed range corresponding to that occurring in the preselected, i.e., fifth position of the throttle pedal. Operation is initiated when the throttle is depressed to the preselected position by momentarily actuating an override control switch S–T. For convenience, an indication is provided to the operator whenever the throttle is depressed to the preselected position. In the preferred embodiment lamp 70 is illuminated when the throttle is in the fifth position so as to advise the operator that the override control circuit can be activated by actuation of the override switch. Upon actuation of the circuit, pressure can be removed from the throttle pedal. The override control circuit may be disengaged by either depressing the throttle pedal beyond the fifth position, by switching the forward-reverse switch to the reverse position, or upon the occurrence of any events which would otherwise cause power to be removed from the drive motor, i.e., opening of any of switches 4, S–K, S–ST, or S–BR.

The override control circuit comprises a relay T and a momentary actuating switch S–T connected in series circuit intermediate junction 42 (of armature switch S–A3 and armature solenoid A3) and junction 58 (of field weakening switch S–FW1 and diode 32). A latching contactor C–T1 of relay T, is connected in parallel with actuating switch ST. An indicating arrangement comprising lamp 70, resistor 72 and diode 74 is serially connected between junctions 42 and 58. Resistor 72 limits lamp current and diode 74 prevents undesired reverse currents.

An additional contactor C–T2, of relay T is connected from line 40 to a junction 68. Diodes 62, 64 and 66 are connected from junction 68 to respectively, junction 42, and the junctions of armature switches S–A2 and S–A1 and their associated armature relays. An additional diode, 60, is connected from junction 68 to arm 54 of the forward-reverse switch S–FR.

As previously described the motor armature current is controlled by the switching means including armature switches S–A1, S–A2, and S–A3, and the field flux is controlled by switching means including field weakening switches S–FM1, S–FW2, S–FW3 and S–FW4. The override control circuit is operative when the throttle is depressed to the fifth position when this occurs, a potential difference appears between junctions 42 and 58, since switches S–FW1 and S–A3 are closed. The resulting illumination of lamp 70 indicates that the throttle is in the fifth position. If the actuating switch S–T is momentarily depressed while the throttle remains in the fifth position, relay T is activated, and remains activated because of the closure of holding contactor C–T1. Contactor C–T2 is closed while relay T remains energized. Pressure can be removed from the foot pedal so as to open armature switches S–A1, S–A2 and S–A3, since these switches will be bypassed by contactor C–T2 and, respectively, diodes 62, 64, and 66 so as to maintain current conduction through armature relays A1, A2, and A3. When the foot pedal is returned to the neutral position, arm 52 of start switch S–RTN is disconnected from RUN terminal 56, and returned to OFF terminal 48. However, conduction is maintained through solenoids F1, F2, and FR because positive potential is supplied from line 40 through contactor C–T2 and diode 60 to arm 54 of switch S–FR. The override control circuit may be engaged when the vehicle is in forward or reverse propulsion. However, it will be disengaged if the direction of propulsion is changed.

Operation of the override control circuit is normally discontinued by momentarily pushing down on the throttle pedal. As the throttle is depressed to position six, field weakening switch S–FW1 is opened causing relay solenoid T to be de-energized and contactors C–T1 and C–T2 to open. When pressure is subsequently released from the foot pedal, positive potential is removed from arm 54 of the forward-reverse switch. Therefore, the previously energized contactors in the motor circuit (F–F1 and C–F2, or C–R1 and C–R2) are opened and electrical power is removed from the motor. Additionally the opening of C–T2 removes positive potential from armature solenoids A–3, A–2, and A–1 causing reinsertion of armature resistors 14, 16 and 18 into the armature circuit.

Operation of the override control circuit is additionally discontinued when any of switches 4, S–K, S–BR or S–ST are opened. When any of these are opened, power is removed from solenoid RTN, causing contactors C–RTN1 and C–RTN2 to open. Therefore, the previously energized contactors in the motor circuit (C–F1 and C–F2, or C–R1 and C–R2) are opened causing power to be removed from the motor. This also removes power from line 40 causing relay T to be de-energized so as to discontinue operation of the cruise-control circuit. Additionally opening of contactor C–RTN1 prevents reapplication of power to the motor until the throttle is returned to the neural position.

Operation of the override control circuit is additionally discontinued when the direction of vehicle travel is changed. Actuation of the forward-reverse switch S–FR results in an interruption of voltage on line 40. This is due to the normal time interval between the opening of the previously closed forward-reverse contactor (C–FR1 or C–FR2) and the closure of the previously opened forward-reverse contactor. Accordingly, relay T, and thus contactors C–T1 and C–T2 open.

The arrangement described above permits operation of an electrically propelled vehicle, utilizing a pressure biased throttle member, such as a foot pedal, at a predetermined torque-speed increment without the application of continuous operating pressure on the throttle member.

Various modifications may be made within the scope of the invention. For example override control operation could be maintained with a predetermined amount of field weakening by connecting the junction of relay T and indicator lamp 70 to switch S–FW2 and by connecting a diode such as diode 32, serially from this junction to the junction of resistors 20 and 22. Operation of the override control circuit could be effected at plural modes by appropriate switching of the override control circuit. Accordingly, various changes, modifications and substitutions, may be made in the embodiment described herein without departing from the true scope and spirit of the invention as defined in the appended claims.

What I claim as new and desire to secure by Letters Patent of the United States is:

1. In a propulsion control system for an electrically propelled traction vehicle wherein a storage source of direct current energizes D–C traction motor means with motor windings, variable impedance means coupled in circuit with said motor windings and said source, a plurality of control switches each having a first quiescent state and a second actuated state, said control switches being coupled in circuit with said variable impedance means so that actuation of said control switches from said first to said second state modifies the impedance magnitude of said variable impedance means and actuation of said control switches in a predetermined sequence increases the output speed of said motor means, for a given motor load, from a minimum value, the combination comprising:

(a) a mechanically biased throttle member;
(b) means coupling said throttle member to said control switches so that application of increasing pressure to said throttle member, sequentially actuates said control switches in said predetermined sequence;
(c) override switching means adapted to be manually actuated to maintain operation of said motor means at a speed in excess of said minimum value upon a release of pressure from said throttle member;
(d) relay means having input and output terminals;
(e) logic circuit means comprising input and output terminals, said input terminals being responsive to the state of a predetermined first one of said control switches and of a second one of said control switches which is normally actuated successively to said first one of said control switches, said output terminals providing a signal coincident with the application of such pressure to said throttle member resulting in actuation of said first one of said control switches, but not in actuation of said second one of said control switches;
(f) means for coupling said override switching means, and the input terminals of said relay means in circuit with the output terminals of said logic circuit means so that said relay means is energized upon the simultaneous actuation of said override switching means and the appearance of said signal in the output terminals of said logic circuit means;
(g) means for coupling the output terminals of said relay means in circuit with said variable impedance means to maintain, subsequent to release of pressure from said throttle member, the impedance modifications of said variable impedance means effected by actuation of such control switches as are actuated coincident upon energization of said relay means.

2. The propulsion control system of claim 1 wherein said source of direct current is coupled to said motor means through motor motion contacting means, means for closing said motion contacting means in response to the application of pressure to said throttle member, and means responsive to the energization of said relay means for maintaining closure of said motion contacting means upon the removal of pressure from said throttle member.

3. The arrangement of claim 2 comprising means for de-energizing said relay means upon the application of sufficient pressure to said throttle member to result in actuation of said second one of said control switches.

4. The propulsion control system of claim 2 wherein said motor means comprises an armature winding and a field winding, first variable impedance means are coupled in circuit with said armature winding and source to control motor armature current and second variable impedance means are coupled in circuit with said field winding and source to control the flux of the motor field, said predetermined first one of said control switches being coupled in circuit with said first variable impedance means and said second one of the control switches being coupled in circuit with said second variable impedance means.

5. A propulsion control system for an electrically propelled traction vehicle utilizing a storage energy source of direct current to energize D-C traction motor means with armature and field windings, armature resistance means coupled serially with said armature winding across said source, a plurality of armature relays each comprising an armature solenoid and an armature contactor, said armature contactors being coupled across portions of said armature resistance means so that sequential energization of said armature relays and resultant closure of said armature contactors modifies the resistance magnitude of said armature resistance, plural field weakening switches coupled in circuit with said field winding and said source so that sequential opening of said field weakening switches modifies the flux of said motor field, the combination comprising:

(a) a plurality of armature switches, each of said armature switches being coupled to actuate a respective one of said armature solenoids across said source;
(b) a mechanically biased throttle member;
(c) means for coupling said throttle member to said armature switches and to said field weakening switches so that application of increased pressure on said throttle member sequentially actuates said armature switches said field weakening switches in a predetermined sequence;
(d) an override relay comprising an override solenoid and first and second override contactor means;
(e) a pressure actuated momentary contact switch;
(f) means coupling said override solenoid and said contact switch across said source in series circuit with a predetermined one of said field switches and a predetermined one of said armature switches so that said override solenoid is initially energized solely upon actuation of said contact switch and simultaneous application of pressure to said throttle member providing closure of said one field switch and of said one armature switch;
(g) means coupling said first override contactor means in circuit with said contact switch to latch on said override solenoid subsequent to its initial energization;
(h) means for coupling said second contactor means to latch on those armature solenoids which are energized coincident with the initial energization of said override solenoid, whereby the magnitude of said armature resistance means and the flux produced by said field is maintained upon a release of pressure from said throttle member and whereby the override solenoid is de-energized upon application of sufficient pressure to said throttle member to open said one field switch.

6. The arrangement of claim 5, comprising means for perceptually indicating the simultaneous closure of said one field switch and said one armature switch.

7. The propulsion control system of claim 5 wherein application of increasing pressure on said throttle member sequentially closes said armature switches to successively decrease the resistance magnitude of said armature resistance means, and successively opens said field weakening switches and said source having first and second terminals of opposing polarity;

(a) field resistance means coupled in series circuit with said field winding across said first and second terminals;
(b) means coupling said field weakening switches from said first terminal to different portions of said field resistance means so that sequential opening of said field weakening switches increases the magnitude of the field resistance coupled serially with said field winding;
(c) means coupling each of said armature switches to said second terminal and said armature solenoids to said first terminal, and serially connecting each of said armature switches with a respective one of said armature solenoids; and
(d) coupling means coupling said one armature switch, said override solenoid, said contact switch and said one field weakening switch in series circuit with said first and second terminals.

8. The arrangement of claim 7 wherein said one field weakening switch is connected to said field resistance means by unilaterally conducting means poled to preclude energization of said override solenoid upon opening of said on field weakening switch.

9. The arrangement of claim 7 wherein motor motion contacting means are coupled in series circuit between said motor means and said source, said motor motion contacting means being adapted to open under predetermined conditions to disconnect said motor means from said source; said one armature switch, override solenoid, contact switch and said one field weakening switch being coupled serially with said motor motion contacting means across the first and second terminals of said source, whereby said override solenoid is de-energized upon the opening of said motor motion contacting means.

10. The propulsion control system of claim 9 wherein return to neutral switching means are connected to close said motor motion contacting means responsive to the application of pressure to said throttle member and means responsive to actuation of said override solenoid for maintaining closure of said motor motion contacting means upon removal of pressure from said throttle member.

11. The arrangement of claim 9 wherein said motor motion contacting means are coupled in series circuit with said second terminal and the aramture and field windings of said motor means.

12. The arrangement of claim 7 wherein said one armature switch constitutes that armature switch whose closure provides minimal obtainable armature resistance.

13. The arrangement of claim 12 wherein said one field switch constitutes the initial one of the field switches opened upon the application of increasing pressure to said throttle member.

References Cited

UNITED STATES PATENTS

| | | | |
|---|---|---|---|
| 321,150 | 6/1885 | Sprague | 318—493 X |
| 3,016,483 | 1/1962 | Fath et al. | 318—428 X |
| 3,227,938 | 1/1966 | Draxler | 318—551 X |
| 3,241,025 | 3/1966 | Hartman | 318—338 |
| 3,297,930 | 1/1967 | Payne | 318—338 X |
| 3,559,020 | 1/1971 | Imaizumi et al. | 318—405 |

J D MILLER, Primary Examiner

H. HUBERFELD, Assistant Examiner

U.S. Cl. X.R.

318—293, 338, 349, 359, 405, 422, 428, 516